June 5, 1923.
F. R. CHESTER
ADVERTISING DEVICE
Filed Aug. 23, 1922
1,458,050
2 Sheets-Sheet 1
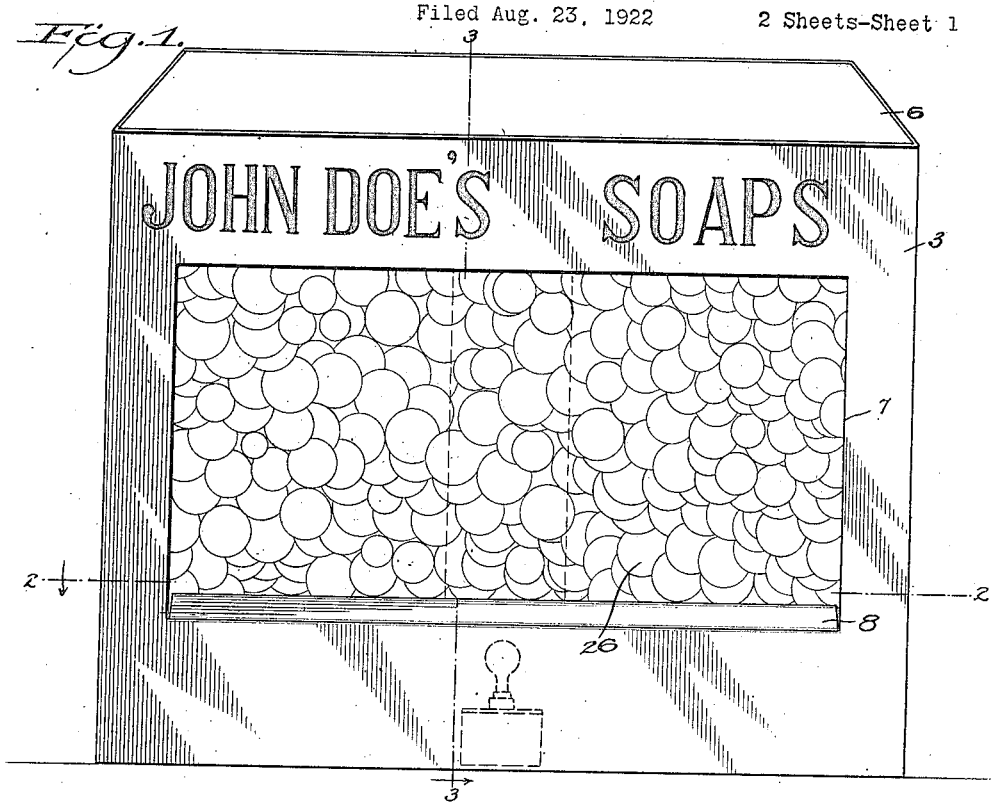
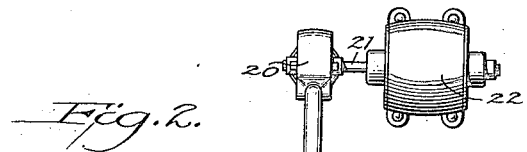
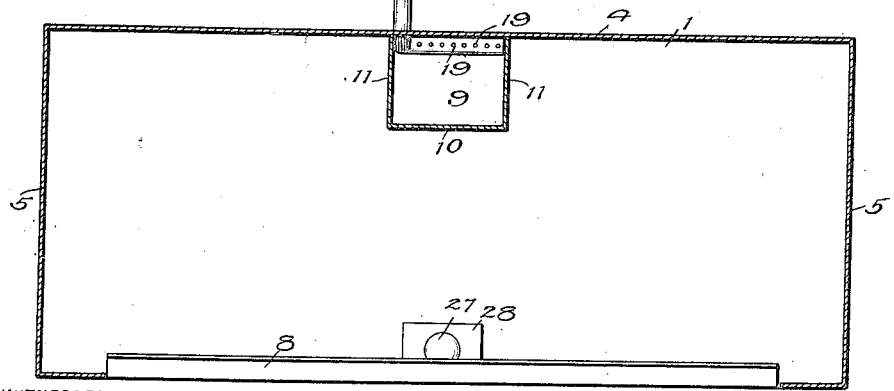
WITNESSES
INVENTOR
Frank R. Chester
BY
ATTORNEYS June 5, 1923.

F. R. CHESTER

ADVERTISING DEVICE

Filed Aug. 23, 1922

WITNESSES

INVENTOR
Frank R. Chester
BY
ATTORNEYS

Patented June 5, 1923.

1,458,050

UNITED STATES PATENT OFFICE.

FRANK R. CHESTER, OF ASBURY PARK, NEW JERSEY.

ADVERTISING DEVICE.

Application filed August 23, 1922. Serial No. 583,758.

*To all whom it may concern:*

Be it known that I, FRANK R. CHESTER, a citizen of the United States, and a resident of Asbury Park, in the county of Monmouth and State of New Jersey, have invented certain new and useful Improvements in Advertising Devices, of which the following is a full, clear, and exact description.

The present invention relates to an advertising device, and more particularly to a device wherein soapy water is blown into bubbles which are allowed to fall in a cascade or mass, and to provide means for illuminating the mass of bubbles and to secure a continuous operation; the bursting bubbles returning to a liquid form which is then acted upon by the bubble-blowing mechanism, the general effect produced being extremely pleasing, ornamental, and somewhat confusing and interesting.

The invention is shown in the accompanying drawings, in which

Figure 1 shows the apparatus embodied in one form of advertising device;

Figure 2 shows a cross-section taken on the line 2—2 in Figure 1 looking downward, parts being shown in plan.

Similar reference characters will be employed to designate corresponding parts.

Figure 3:
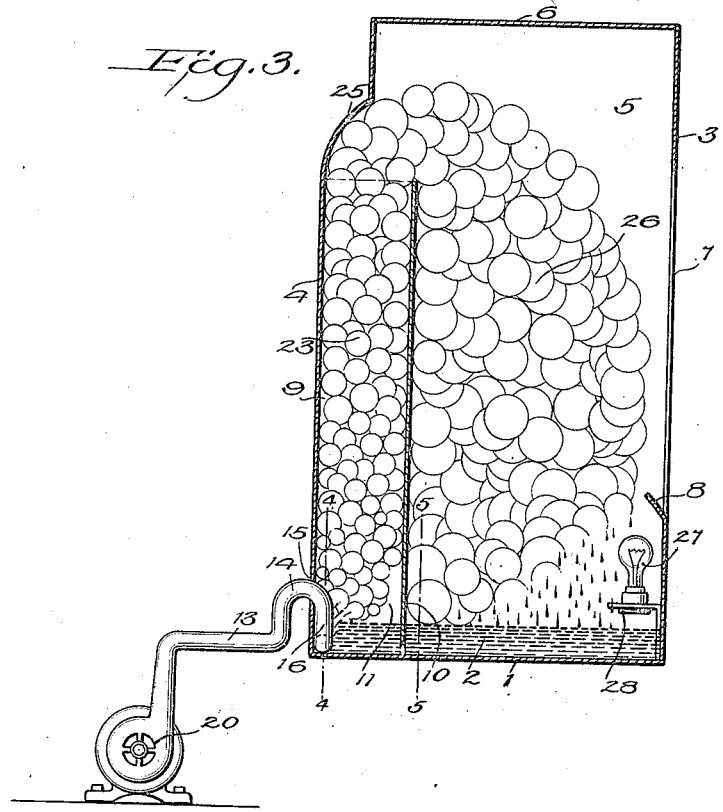
Figure 3 shows a vertical section taken on the line 3—3 in Figure 1, parts being shown in elevation.
Figure 4:
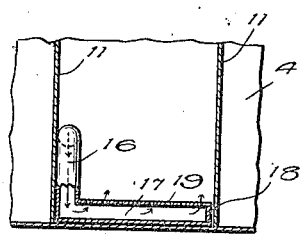
Figure 4 shows a fragmentary sectional view taken on the line 4—4 in Figure 3.
Figure 5:
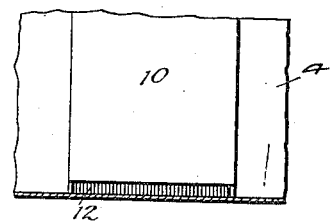
Figure 5 shows a similar view taken on the line 5—5 in Figure 3, both views looking towards the left in that figure.

The apparatus comprises a tank 1 which may be of any suitable size and shape, adapted to receive a quantity of soapy water 2. As shown in the drawing this tank is in plan rectangular and it is formed at the bottom of a casing comprising a front 3, a back 4, sides 5, and a top or cover 6, forming a box-like container. The front 3 is provided with an opening 7 having along its lower edge an inturned flange or guard 8. Within the box-like container is a vertically disposed chamber 9 having a front wall 10 and side walls 11, the side walls secured to the inner surface of the back 4. This container is in cross-section rectangular in form, although it may be cylindrical in form, and it is entirely open at its upper end. At its lower end the side walls 11 may extend to engage the surface of the bottom 1, but the front wall 10 has its lower edge above the bottom 1, thus forming an opening 12. The soapy water 2 may flow freely through the opening 12 into the chamber 9. A pipe 13 provided with a goose-neck 14 enters the chamber 9, above the water level, through an opening 15 and is then extended downwardly as at 16 and provided with a lateral extension 17 closed at its outer end 18 and provided with apertures 19 along its upper surface. (See Figs. 2 and 4.) The extension 17 will be below the surface of the soapy water 2, for by reason of the goose-neck 14 a substantial depth of soapy water may be maintained without liability of flowing backward through the pipe 13. The pipe 13 connects with a blower 20 of any suitable form, which, as shown in Fig. 2 may be mounted upon the shaft 21 of an electric motor 22, by means of which a rotary motion is imparted to the blower, thus causing a blast of air to be forced through the pipe 13, goose-neck 14 and extension 17, into the soapy water. The action of the air as it passes out of the openings 19 produces a mass of bubbles 23 which will be forced upwardly in the chamber 9 and will pass out of the upper end thereof as indicated in Fig. 3, and as the bubbles accumulate they will fall over and spread out in mass form, as indicated in Figs. 1 and 3. By placing the extension 17 at the rear of the chamber the mass of bubbles will be forced in a forward direction as they pass out of the upper end of the chamber, but to facilitate this action, the upper end of the chamber may be provided with a curved deflector 25. (See Fig. 3.) As before stated, the bubbles, as they fall downwardly will spread laterally, forming a mass of bubbles as indicated at 26. Within the casing is mounted an electric lamp 27 supported upon a bracket 28 and hidden from the view of the observer by the inturned flange 8. This lamp is preferably of the type known as a nitrogen lamp, generating not only considerable light but also considerable heat, and it performs the double function of illuminating the cascade of bubbles, bringing out the opalescent colors therein, and also bursting the bubbles in the lower part of the tank, as clearly indicated in Fig. 3, and as the bubbles are broken the soapy water of which they are formed, drops into the water contained in the tank, to be again formed into bubbles, the operation being practically continuous, and the mass or cascade being in constant motion, falling by the force of gravity and slipping over each other, producing a very pleasing effect.

The essential feature of the invention consists not in the details which have been shown and described, but in the means whereby a continuous operation is produced, and in its simplest form it may consist of a tank, a bubble-chamber, an air generator discharging within the chamber, and means for conducting air below the surface of the water contained in the chamber, with means permitting the water produced by the bubbles to fall back into the tank and flow into the bubble chamber. It is of course obvious that the containing casing may be entirely omitted and that the bubble-bursting chamber may take any form desired.

I claim:

1. In an advertising device, in combination, a tank, a vertically-disposed chamber supported therein, said chamber being open at the top and having an opening at its lower end permitting water to flow from the tank into the chamber, an air-generator, a pipe leading therefrom into the chamber above the water level and having a perforated extension within the chamber below the water level.

2. In an advertising device, in combination, a tank, a vertically-disposed chamber supported therein, said chamber being open at the top and having an opening at its lower end permitting water to flow from the tank into the chamber, an air-generator, a pipe leading therefrom into the chamber above the water level, and having a perforated extension within the chamber below the water level, said extension being located to one side of the longitudinal center of said chamber.

3. In an advertising device, in combination, a tank, a vertically-disposed chamber supported therein, said chamber having an open upper end, an air-generator, a pipe leading therefrom into the chamber above the water level and having a perforated extension within the chamber below the water level and an opening at the base of said chamber below the water level.

4. In an advertising device, in combination, a tank, a bubble-chamber open at the top supported therein, an opening at the lower end of the chamber permitting water to flow from the tank into the chamber, means for conducting air under pressure into the chamber below the water level therein and means located adjacent to the lower end of the chamber, for radiating heat and light.

5. In an advertising device, in combination, a tank, a bubble-chamber supported therein, said chamber communicating with the tank at its lower end and being open at its upper end, an air pipe leading into the bubble-chamber below the water level therein, means for deflecting the bubbles as they emerge from the upper end of the bubble-chamber and means for bursting and illuminating the bubbles.

6. In an advertising device, in combination, a tank, a bubble chamber open at the top supported therein, an opening at the lower end of the bubble chamber below the water level in the tank, means for forcing air under pressure into the bubble chamber below the water level therein, and means adjacent the lower end of the bubble chamber for bursting the bubbles in the tank.

7. In an advertising device, in combination, a tank, a bubble chamber open at the top supported therein and extending upwardly above the water level in the tank, an opening at the lower end of the bubble chamber below the water level, means for conducting air under pressure into the bubble chamber below the water level therein at a point diametrically opposite the opening in the bubble chamber.

FRANK R. CHESTER.